(12) United States Patent
Masuch

(10) Patent No.: US 12,639,801 B2
(45) Date of Patent: May 26, 2026

(54) METHOD FOR DETERMINING A POSITION OF A CORNER REGION OF AN ELECTRODE ASSEMBLY STACK

(71) Applicant: Volkswagen Aktiengesellschaft, Wolfsburg (DE)

(72) Inventor: Steffen Masuch, Braunschweig (DE)

(73) Assignee: PowerCo SE, Salzgitter (DE)

( * ) Notice: Subject to any disclaimer, the term of this patent is extended or adjusted under 35 U.S.C. 154(b) by 313 days.

(21) Appl. No.: 18/419,293

(22) Filed: Jan. 22, 2024

(65) Prior Publication Data

US 2024/0249401 A1 Jul. 25, 2024

(30) Foreign Application Priority Data

Jan. 20, 2023 (DE) ..................... 10 2023 200 459.3

(51) Int. Cl.
| | |
|---|---|
| *G06T 7/00* | (2017.01) |
| *G06T 7/12* | (2017.01) |
| *G06T 7/13* | (2017.01) |
| *G06T 7/73* | (2017.01) |
| *G06V 10/82* | (2022.01) |
| *G06V 20/50* | (2022.01) |

(52) U.S. Cl.
CPC .............. *G06T 7/0004* (2013.01); *G06T 7/12* (2017.01); *G06T 7/13* (2017.01); *G06T 7/73* (2017.01);
(Continued)

(58) Field of Classification Search
CPC .. G06V 10/82; G06V 2201/06; G06T 7/0004; G06T 7/12; G06T 7/13; G06T 7/70;
(Continued)

(56) References Cited

U.S. PATENT DOCUMENTS

| | | | |
|---|---|---|---|
| 11,378,527 B2 | 7/2022 | Heo et al. | |
| 2020/0350637 A1 | 11/2020 | You et al. | |

(Continued)

FOREIGN PATENT DOCUMENTS

| | | |
|---|---|---|
| DE | 102017216158 A1 | 3/2019 |
| DE | 102020112814 A1 | 11/2020 |

(Continued)

OTHER PUBLICATIONS

Steffen Masuch et al; "Applications and Development of X-ray Inspection Techniques in Battery Cell Production"; Dec. 21, 2022; MDPI Processes.

(Continued)

*Primary Examiner* — Raphael Schwartz
(74) *Attorney, Agent, or Firm* — Muncy, Geissler, Olds & Lowe, P.C.

(57) ABSTRACT

A method for determining a position of corners of polygonal electrode sheets in at least one corner region of an electrode assembly stack, comprising the steps: 3D imaging of the corner region of the electrode assembly stack in an imaging region by means of an imaging process, so that a data set is created that includes 3D position information on the electrode sheets in the corner region of the electrode assembly stack relative to a carrier or to a marker arranged in the imaging region; and determining, from the data set, a first and a second edge profile of the edges framing the corner region of each electrode sheet. A position of the corner of the respective electrode sheet is determined on the basis of the edge profile. The electrode sheets and the edges thereof can be determined via a neural network system.

15 Claims, 11 Drawing Sheets

(52) U.S. Cl.
CPC .............. *G06V 10/82* (2022.01); *G06V 20/50*
(2022.01); *G06T 2200/04* (2013.01); *G06T*
*2207/20084* (2013.01); *G06T 2207/30108*
(2013.01)

(58) Field of Classification Search
CPC ........... G06T 2207/30164; G06T 2207/30108;
H01M 10/0404; H01M 6/005
See application file for complete search history.

(56) References Cited

U.S. PATENT DOCUMENTS

| | | | |
|---|---|---|---|
| 2022/0216501 A1 | 7/2022 | Oh et al. | |
| 2023/0003670 A1 | 1/2023 | Kraken et al. | |

FOREIGN PATENT DOCUMENTS

| | | | | | |
|---|---|---|---|---|---|
| DE | 102020207613 | A1 | 12/2021 | | |
| DE | 102021117152 | A1 | 1/2023 | | |
| DE | 112022005704 | T5 * | 9/2024 | ........ | H01M 10/0459 |
| JP | 2023553923 | A * | 12/2023 | ........ | H01M 10/0409 |
| KR | 20200123401 | A * | 10/2020 | ........ | H01M 10/0585 |
| WO | WO2016114257 | A1 | 7/2016 | | |

OTHER PUBLICATIONS

Ruben Leithoff et al; "Process-Product Interdependencies in Lamination of Electrodes and Separators for Lithium-Ion Batteries"; Apr. 6, 2022; MDPI energies.

* cited by examiner

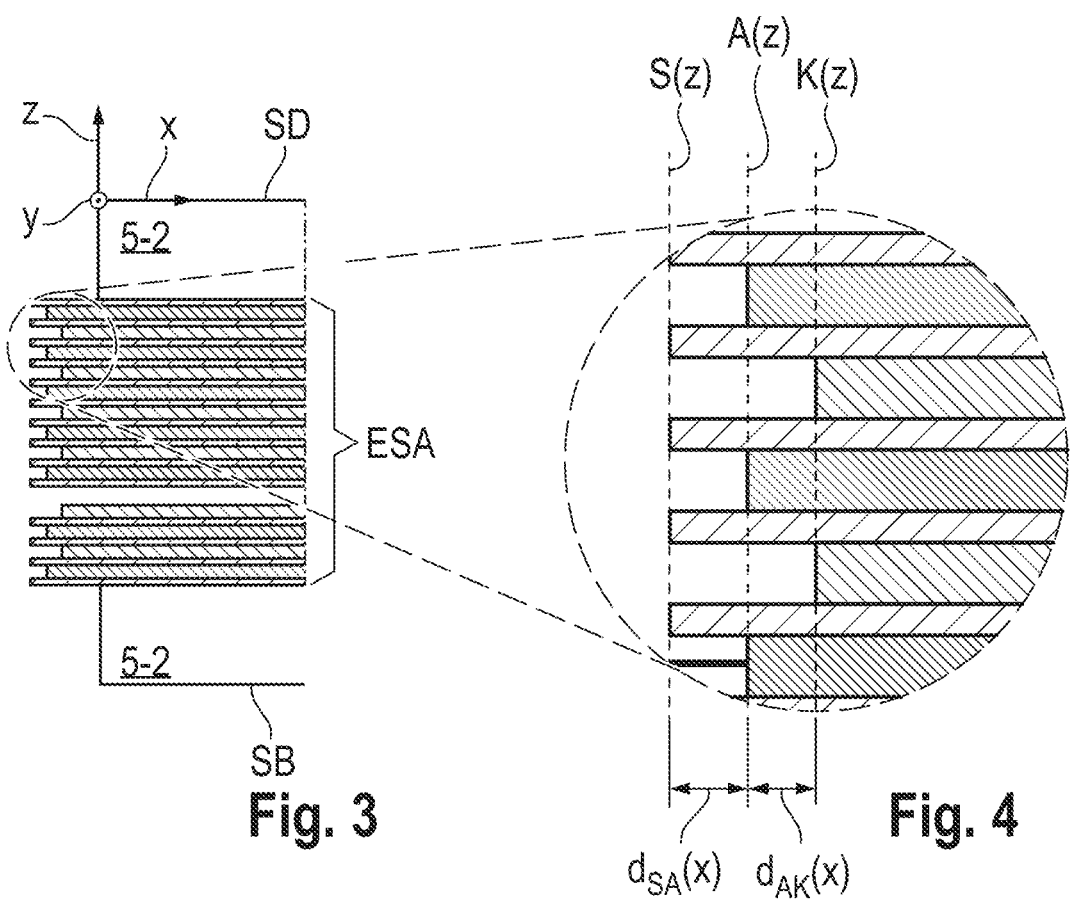
Fig. 3
Fig. 4
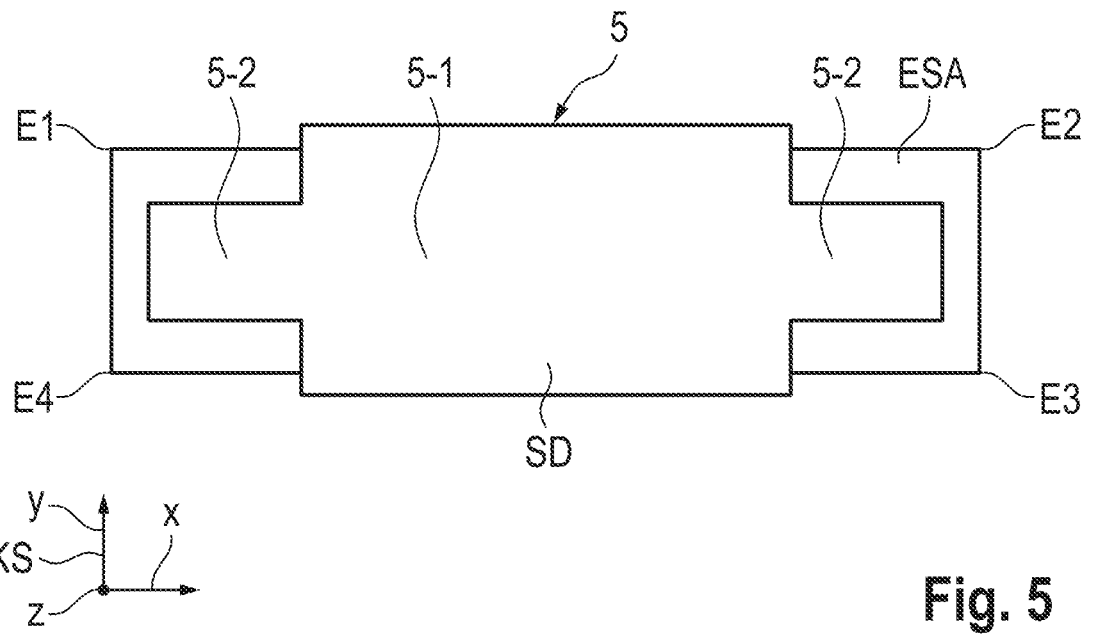
Fig. 5

Result extraction – cell stack corner E1

Result extraction – cell stack corner E3

METHOD FOR DETERMINING A POSITION OF A CORNER REGION OF AN ELECTRODE ASSEMBLY STACK

This nonprovisional application claims priority under 35 U.S.C. § 119(a) to German Patent Application No. 10 2023 200 459.3, which was filed in Germany on Jan. 20, 2023, and which is herein incorporated by reference.

BACKGROUND OF THE INVENTION

Field of the Invention

The invention relates to a method for determining a position of a corner region of an electrode assembly stack. The invention additionally relates to a computer program for carrying out the method.

Description of the Background Art

In the manufacture of electrode assembly stacks, which may also be referred to as ESA (electrode-separator assembly), electrode sheets of the anode and of the cathode are stacked in an alternating sequence. A separator layer that electrically insulates the electrodes from one another is located between the electrode sheets in each case.

The placement accuracy of the electrode sheets is a quality criterion for the process capability of the stacking process and at the same time is also a safety-relevant and function-relevant product characteristic of the ESA. The goal is for all electrode sheets to be placed at a defined spacing and in a defined tolerance range. The higher the electrode coverage in the ESA, the higher the electrochemical performance. In many ESA, the electrode sheets of the anodes are circumferentially larger by one to a few millimeters in order to allow complete overlap of the cathodic electrode sheets. The smaller the circumferentially projecting margin of the anode sheets, the more precisely the placement of the stack must be accomplished. At the same time, however, it is desirable for the production speed to be increased, which conflicts with accurate placement. For this reason, the placement accuracy of the electrode sheets in the ESA must be determined reliably, quickly, and also precisely.

Various methods are known in the prior art for determining the placement accuracy, wherein X-rays are typically used for imaging. However, the 3D image data obtained from such images often has a poor signal-to-noise ratio, depending on the recording speed, so the image data often is interpreted by specialists in imaging software in order to determine the corresponding parameters, such as, e.g., the position of the corners of the electrode sheets.

Furthermore, even though a rotation of the electrode sheets can be determined in the prior art so that a placement accuracy can be ascertained, corrective measures for improved placement cannot necessarily be derived.

SUMMARY OF THE INVENTION

It is therefore an object of the invention to provide a method that ascertains the positions of corner regions of the electrode sheets in an ESA in a fully automatic, robust, and precise manner.

Accordingly, a method, for example a computer-implemented method, for determining a position of at least one corner region of individual polygonal, for example rectangular, electrode sheets in an electrode assembly stack is proposed, comprising the steps: 3D imaging of the corner region of electrode sheets of the electrode assembly stack in an imaging region by means of an imaging process, for example a computed tomography imaging process, so that a data set is created that includes 3D position information on the electrode sheets in the corner region of the electrode assembly stack relative to a carrier and/or to a marker arranged in the imaging region of the imaging process; Determination, from the data set, of a first and a second corrected edge profile of the edges framing the corner region of each electrode sheet of the electrode assembly stack, wherein a position of the corner of the respective electrode sheet is determined on the basis of the corrected edge profile, for example through extrapolation of the corrected edge profiles, wherein, to start with, the first and second edge profiles are determined with at least the following steps: Creation of a multiplicity of xz and yz sectional images; Identification of the electrode sheets in each xz sectional image and in each yz sectional image; In each xz and in each yz sectional image, and for each identified electrode sheet therein; Determination, by a first neural network system, of an electrode sheet profile of a reference location region in the electrode assembly stack up to an electrode edge location of the electrode sheet; Adjustment of the electrode sheet profile so that the electrode sheet profile at the height of the reference location extends from the reference region to a corrected electrode edge location, wherein a path length of the electrode sheet profile remains unchanged; and Determination in each case of a straight line that runs along the corrected electrode edge locations along the first or the second edge for each electrode sheet, wherein the straight lines correspond to the first edge profile and the second edge profile.

The first convolutional neural network system is, for example, a trained convolutional neural network system that is configured to recognize the electrode sheet profile.

A coordinate system, for instance a Cartesian coordinate system, can be associated with the data set and, for example, with the imaged region; in doing so, the axes are preferably aligned such that a z axis is perpendicular to the electrode sheets, and x and y axes are parallel, each perpendicular to the z axis. Provided that the electrode sheets are rectangular electrode sheets, the x and y axes are preferably aligned along the desired edge alignment of the electrode sheets.

The coordinate system can be associated with the marker and/or with the carrier, wherein the y axis runs, for example, along a first direction of extent of the carrier, and the x axis runs along a second direction of extent of the carrier.

In this context, it is noted that the expressions "xz sectional image" and "yz sectional image" need not necessarily be understood in relation to the Cartesian coordinate system, but serve primarily to permit a conceptual distinction between the sectional images. The xz sectional images and the yz sectional images do not run parallel to one another, however, and preferably are aligned such that the section planes along which the sectional images are created run approximately or exactly perpendicular to the first or the second edge profile of an ideally aligned electrode sheet. For example, provided that the carrier reflects the electrode sheet geometry along a first and a second edge, the sectional images can also run perpendicular to a first and a second edge of the carrier.

For better understanding, it is noted here that the term "edge profile" describes the entirety of an edge of an electrode sheet, whereas the term "electrode edge location," in contrast, refers, for example, to the position of the electrode edge in a sectional image. The edge profile of the electrode sheets can be determined in 3D for each electrode sheet from the multiplicity of electrode edge locations in the sectional images.

The electrode edge location in this case corresponds, for example, to a position of an edge end section/electrode sheet margin of the electrode sheet lying outside the stack.

The corrected electrode edge location can be ascertained by determining an electrode sheet position at a multiplicity of data points, wherein a first data point corresponds to the electrode edge location, and wherein the reference location of the electrode sheet in the electrode assembly stack is acquired through at least one additional data point, wherein the data points are determined by the first convolutional neural network system, wherein the corrected electrode edge location is achieved by shifting at least the first data point to the height of the reference location, wherein a path length between the first and the at least one additional data point remains constant so that the path length of the electrode sheet profile remains unchanged.

A path that has an associated path length can be determined from the data points in each sectional image and electrode sheet. The path length can be determined by means of the distances of the data points from one another. Alternatively, it is possible to determine the path length of the path from a distance (for example: spline segments of the data points) determined through the data points.

An important aspect in the determination of the corrected electrode edge location is that the path length of the electrode sheet profile or path remains constant. This achieves the result that the corrected electrode edge location would not imply any contraction or expansion of the electrode sheet.

For example, all data points of the electrode sheet can be shifted in each sectional image and for each electrode sheet in such a manner that they form a straight path in the sectional image, wherein the data points are shifted to the height of the reference location. As a result, an edge profile is determined that would correspond to electrode sheets running entirely in one plane. Often, some of the electrode sheets in a stack are bent or folded at the edges, which makes a determination of the position of the corner region more difficult. The shifting of the data points to the height of the reference location eliminates this problem.

The determination of the data points serves, for example, to establish an electrode sheet profile in the sectional image, wherein the corrected edge profile is achieved through a "straightening" of the electrode sheet profile in the sectional image if such is necessary.

From the corrected electrode edge locations, a corrected edge profile can be determined for each electrode sheet. The position of the corner region or the position of the corner of the electrode sheet if the electrode sheet were arranged in a fully planar manner in the stack can then be determined from these corrected electrode edge profiles by extrapolation or other suitable measures. It is only from this information that an above-described quality and/or performance criterion can be derived reliably.

The term "neural network system" includes, for example and preferably, a convolutional neural network system, and for this reason is also abbreviated as CNN system.

In the context of the present specification, the neural network system is always a trained system that has been trained, using appropriately labeled data sets, to recognize or classify appropriate characteristics.

Appropriate training methods are known to the person skilled in the art.

A CNN system includes, for example, a multiplicity of neural networks, for example a multiplicity of convolutional neural networks, wherein each one is trained and designed for a specific task.

Each xz sectional image is generated with a parallel offset along a plane that includes a stacking direction (z) of the electrode assembly stack and a first section direction (x) that runs perpendicular to a first edge profile direction imparted by the carrier and/or the marker, and/or wherein each yz sectional image is generated with a parallel offset along a plane that includes the stacking direction (z) of the electrode assembly stack and a second section direction (y) that runs perpendicular to a second edge profile direction imparted by the carrier and/or the marker.

According to an example of the invention, the following steps are provided: For each electrode sheet, determination of a first straight line through the corrected electrode edge locations determined from the xz sectional images, wherein the first straight line corresponds to the corrected first edge profile; For each electrode sheet, determination of a second straight line through the corrected electrode edge locations determined from the yz sectional images, wherein the second straight line corresponds to the corrected second edge profile.

According to an example of the invention, provision is made that an intersection point of the first and second edge profiles is determined for each electrode sheet, for example wherein the determination of the intersection point includes an intersection point with reference to a projection of the edge profile along the stacking direction, which is to say on a plane, wherein the position of the corner of the respective electrode sheet is associated with the intersection point.

Since the corner regions of the electrode sheets may be rounded or broken off, this example can serve to identify the position of the corner of the electrode sheet very exactly.

According to an example of the invention, provision is made that the method is carried out for two or more corner regions of the electrode sheets of the electrode assembly stacks, and in this way the position is determined for two or more corners of the electrode sheets.

The corner regions can be accomplished in parallel during a single imaging of the electrode assembly stack, or serially with different images of the respective corner regions.

The imaging and evaluation of multiple corner regions, and thus corner positions, allows a more precise determination of the electrode sheet pose in the electrode assembly stack.

For example, provision is made to determine the positions of the corners of two diagonally opposite corner regions of the electrode sheets. This is especially advantageous with rectangular electrode sheet geometries.

The electrode sheets in the xz and the yz sectional images can be identified by an additional, e.g., a second, trained neural network system, for example convolutional neural network system, for the identification of electrode sheets, for example wherein the electrode sheets are identified in the region of the electrode assembly stack that includes the reference location.

The reference location can be, for example, situated in a region of the stack in which the stack is surrounded and compressed by the carrier, so that spacings and an alignment of the electrode sheets are essentially identical. For example, the alignment along the sectional images is accomplished parallel to the carrier in this case, by which means the electrode sheets extend, for example, parallel to one another and horizontally along the x or y direction.

This second CNN system makes it possible to identify the individual electrode sheets in the sectional images, and also to determine a sequence, for instance in the form of a numbering of the electrode sheets. In this way, a relative location of the electrode sheets in the stack can be determined. The electrode sheets can differ with regard to the gray-level values in the sectional images, for example the gray-level values of the electrode sheets vary in the region of the electrode sheet depending on position in the electrode sheet.

A CNN system in accordance with this example permits robust and precise identification of the electrode sheets independently thereof.

The second CNN system can include, for example, three convolutional neural networks (CNN), wherein a first CNN (CNN3) of the second CNN system is equipped to identify a region in the sectional images in which the electrode sheets run between an upper part of the carrier and a lower part of the carrier, wherein the electrode sheets are compressed between the upper and lower parts of the carrier.

This region includes, for example, the reference location and it denotes, for example, the region in which no gaps are present between the electrode sheets. This region is also referred to as the reference location region in the context of this specification.

A second CNN (CNN6) of the second CNN system is equipped, for example, to identify a first type of electrode sheets, for instance the anodes in the reference location region, and a third CNN (CNN7) of the second CNN system is equipped, for example, to identify a second type of electrode sheets, for instance cathodes in the reference location region.

For example, a number of electrode sheets of the first and second types is specified to the CNNs as a boundary condition (or already implicitly established in the training data set), which leads to an increased robustness in the identification of the electrode sheets.

In this way, the electrode sheets can be identified, for example by type and with regard to a stack sequence in the reference location region, by means of the second CNN system.

A pose of the respective electrode sheet relative to the carrier and/or the marker can be ascertained on the basis of the first and the second corrected edge profiles and the position of the at least one corner of the respective electrode sheet.

Especially when a geometry of the electrode sheet is known, the position and the orientation of the electrode sheet, also known to the person skilled in the art as the "pose," can be ascertained. In this way, the location of all corners of the electrode sheet can be determined, for example, wherein only a single corner region is imaged and evaluated.

A deviation from a predefined pose, for example a nominal pose, can be determined relative to the carrier and/or the marker for each electrode sheet on the basis of the determined pose, which is also referred to in the context of the specification as the actual pose, for example wherein the deviation of the pose for each electrode sheet is carried out by means of a specification via an instantaneous center of rotation.

The instantaneous center of rotation makes it possible to describe the deviation of the pose by means of a center of rotation and an angle of rotation of the electrode sheet, for example when the deviation of the pose of the electrode sheet is described not only by a straight-line translation, but also by a rotation. By means of the instantaneous center of rotation, the deviation of the pose can be described completely with only two values (center of rotation and angle of rotation).

The determination of the deviation makes it possible to optimize the production process, for example when systematic deviations of the pose are ascertained.

A placement pose of the electrode sheets on the electrode assembly stack can be adjusted during a production process for another electrode assembly stack on the basis of the deviation determined, so that the deviations are smaller in the other electrode assembly stack.

As a result, an optimization of the placement of the electrode sheets can take place as early as during the production process.

According to an example of the invention, provision is made that positions of remaining corners of the respective electrode sheet that have not yet been determined are ascertained for each electrode sheet from the determined position or positions of the corners, wherein the ascertainment of the remaining corners is carried out from dimensions of the electrode sheet stored in a database.

Thus, complete information about the pose and geometry as well as the position of all corners of the electrode sheets can be determined, which permits an increased degree of robustness and precision of the method.

The multiplicity of electrode sheets can comprise a multiplicity of electrode sheets of a first type and a multiplicity of electrode sheets of a second type.

The electrode sheets of the first type can be anodes, for example, and the electrode sheets of the second type can, for example, be cathodes.

The electrode sheets of the first type can cover a larger area than the electrode sheets of the second type, wherein the electrode sheets of the first type and of the second type can be stacked in alternation in the electrode assembly stack so that the electrode sheets of the first type in the electrode assembly stack project past the electrode sheets of the second type at least on one side, for example on all sides, for example wherein the electrode sheets are stacked concentrically.

The term "concentrically" may refer in this context to the circumstance that the geometric center of every electrode sheet ideally lies on the same axis parallel to the stacking direction and that the electrode sheets have the same orientation.

Arranged between the electrode sheets is a separator layer, as already discussed in the above paragraphs.

For example, the electrode sheets of the first type can be circumferentially larger by a few micrometers or millimeters in order to provide complete overlap of the electrode sheets of the second type. The electrode sheets of the first type, for example, can deviate from the reference location in the circumferential and projecting region, for instance be folded or bent. In this type of projecting electrode sheets, the reference location region can be defined as a region in which the electrode sheets do not project, but instead still rest on the electrode sheets of the second type. There is typically a high degree of parallelism of the electrode sheets in this region, so this region lends itself as a reference location, for example reference height, along which the corrected electrode sheet profile extends.

The electrode sheets of the first type can have a different gray-level range in the sectional images than the electrode sheets of the second type, so that the electrode sheets in the data set can be distinguished on the basis of the different gray-level range.

The gray-level value in the sectional images is determined from, e.g., an absorption coefficient of the electrode sheets, for example an absorption coefficient in the X-ray region of a computed tomography imaging process.

The term gray-level value in this case also includes a color, for example a false color, in the sectional image. The electrode sheets of the first and second electrode types can accordingly also differ in their color in the sectional image.

In a first image processing step, a third trained neural network system for recognizing a provisional electrode edge location of the electrode sheets provisionally determines the electrode edge location of the electrode sheets in each xz and each yz sectional image and for each electrode sheet, and wherein furthermore the reference location is determined in each xz and each yz sectional image and for each electrode sheet, wherein the reference location is determined from a region of the electrode assembly stack where the electrode sheets are stacked at regular distances and, for example, with no gaps along the stacking direction.

In the event that the electrode assembly stack has electrode sheets of the first and of the second type, wherein the electrode sheets of the first type project circumferentially past the electrode sheets of the second type, the following CNN system architecture can be advantageous:

The third CNN system in this case includes, for example, a first CNN (CNN2), which is trained to identify a region of the electrode assembly stack in every sectional image that includes the electrode edge locations of the electrode sheets of the second type, which is to say the (smaller) cathodes, for example.

In addition, the third CNN system includes a second CNN (CNN5), which is trained to detect the electrode edge location of the electrode sheets of the second type, wherein the electrode edge location is treated only as a provisional result in this process, which is expressed with the phrase "provisionally determines." In order to provide a reliable provisional determination, the number of the electrode edge locations to be identified can be specified (for example, implicitly through the training set or through an additional boundary condition). An improved robustness and reliability is achieved by the limitation of the region for recognition of the electrode edge locations.

The electrode edge locations of the first type are provisionally determined in the same manner. In other words, the third CNN system additionally includes a third CNN (CNN1), which determines a region that includes the electrode edge location of the first type in every sectional image. Wherein a fourth CNN (CNN4) then provisionally determines the electrode edge locations of the electrode sheets of the first type in this region.

In order to provide a reliable determination, the number of the electrode edge locations to be identified can be specified (for example, implicitly through the training set or through an additional boundary condition). An improved robustness and reliability is achieved by the limitation of the region for recognition of the electrode edge locations.

The first CNN system can, for example, determine the first and, if applicable, additional data points in these characteristics (type of electrode sheet, position of the electrode sheet in the electrode assembly stack, reference location region, provisional electrode edge locations) recognized by the third and, if applicable, second CNN system, so that a path that includes and connects the data points and reproduces the profile of the electrode sheet in the sectional image can be determined. For example, the first data point here corresponds to the (final) electrode edge location, which is to say no longer to the provisionally determined edge location.

The creation of the path through the data points can likewise be accomplished by means of a CNN.

The first trained CNN system determines, in a second image processing step, the multiplicity of the data points in each xz and each yz sectional image and for each electrode sheet, wherein the determination for the electrode sheets of the first type as well as for electrode sheets of the second type is limited in each case to a region that is predetermined by a provisionally determined electrode edge location of the electrode sheets of the first type or of the second type that is situated farthest inside, which is to say farthest away from the electrode edge locations toward a center of the electrode assembly stack, and a provisionally determined electrode edge location of the electrode sheets of the first type or of the second type that is situated farthest outside, which is to say farthest away from the center of the electrode assembly stack.

This limitation permits reliable determination of the data points by the first CNN system.

A path and a span associated with the path that corresponds to the path length of the multiplicity of data points, are determined for each xz and each yz sectional image and for each electrode sheet, wherein the data points determined for each xz and each yz sectional image and for each electrode sheet are shifted by means of a transformation to a straight path perpendicular to the height of the electrode assembly, namely in such a manner that the path length remains constant, by which means the height of the first data point, for example the height of all data points, of the respective electrode sheet in the respective sectional image is adjusted to the reference location.

The carrier can have corner regions at its corners, wherein at least the corner regions of the carrier have a lower absorption coefficient in comparison with a central region of the carrier, so that X-ray radiation from an imaging process for imaging the electrode assembly stack is absorbed less by the corner regions of the carrier than in the central region of the carrier.

The corner regions of the carrier correspond, for example, to the corner regions of the electrode assembly stack.

A computer program can be provided that comprises computer-readable computer code that, when it is executed on a computer, carries out the method according to the examples.

The computer program can be stored as a computer program product on a computer-readable, non-transitory storage medium.

A carrier for an electrode assembly stack can be provided that has a central region surrounded by edges of the carrier, wherein the carrier additionally has a multiplicity of corner regions that are localized at the ends of its edges, wherein the carrier has a lower absorption in the corner regions in comparison with the central region so that the corner regions are transparent to X-ray radiation, which is to say, for example, absorb less than 20% of the radiation, wherein the central region is not transparent to this radiation, for example wherein the central region absorbs more than 80% of the radiation.

For example, the central region of the carrier can have a stainless steel.

The carrier can be used as a carrier in the method according to the invention.

For example, the corner regions are made of a material that has a low absorption coefficient. Alternatively, the corner regions can have a smaller thickness than the central region so that the absorption is less.

The corner regions can be made of aluminum, carbon, or a plastic, for example wherein the plastic contains ABS, POM.

For example, the mass attenuation coefficient in the corner regions is at a photon energy of 10 keV and 300 keV in the range 2.62 and 0.011 in $m^2/kg$.

The mass attenuation coefficient in the corner regions can be at a photon energy of 10 keV and 300 keV in the range 23.7 and 0.011 in $m^2/kg$.

For example, the imaging region can include a part of the carrier so that the carrier can be used as a frame of reference in order to ascertain the position of the corner or the pose of the electrode sheets.

The marker spheres can be arranged in a previously determined three-dimensional arrangement in the imaging region so that a uniquely defined coordinate system can be determined in each image, so that the position of the corner or the pose of the electrode sheets relative to this coordinate system can be determined and specified.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 shows a section along the x-z plane through an ESA;

FIG. 4 shows an enlarged view of the sectional image in FIG. 3;

FIG. 5 shows a view of the ESA in the carrier;

DETAILED DESCRIPTION

Figure 1:
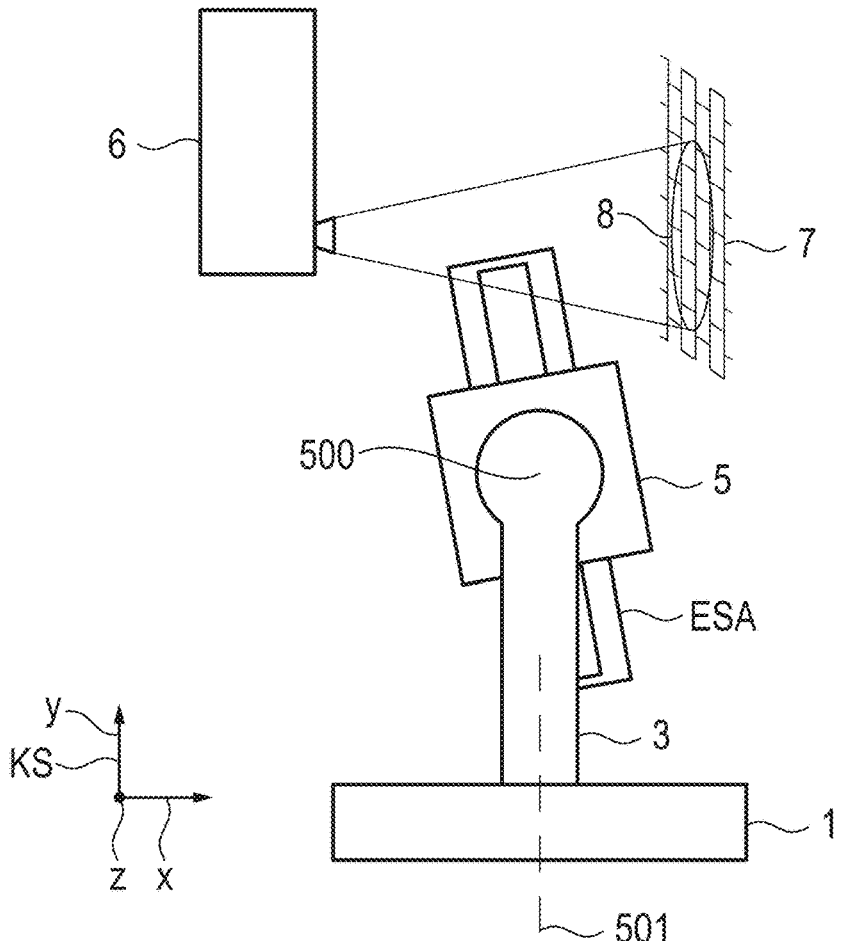
FIG. 1 shows an imaging system for carrying out the method according to the invention.

Depicted in FIG. 1 is a schematic representation of a computed tomography imaging system for imaging a data set of a 3D location information of electrode sheets in an electrode assembly stack (ESA) with respect to a carrier. The imaging system includes an X-ray light source 6 and an X-ray light recording device 7 (detector), which are equipped to create computed tomography images 8 of at least one corner region of the ESA. To this end, the ESA is held in a carrier 5 and is compressed by the same along the stacking direction of the ESA (without limitation of generality, along the z axis of a Cartesian coordinate system KS here). The carrier 5 has a mount that ensures reproducible mounting of the carrier 5 by means of centering sleeves. The carrier 5 is clamped in a holding device 3 so as to be rotatable about a first rotational axis 500, so that the electrode sheets in the ESA can be acquired fully three-dimensionally, at least from a corner region of the ESA. The holding device 3 itself can be attached to a rotary table 1, and be supported such that it can rotate about an additional rotational axis 501 relative to the rotary table 1.

The investigation space, which is to say the volume from which the image is acquired, is always in the same position and has the same orientation on account of the reproducible positions of the coordinate system, the ESA, the X-ray light source (or the X-ray beam direction), and the detector. In this way, a pose of the electrode sheets relative to the carrier or to a marker located in the investigation space, for example, can later be described unambiguously.

Figure 2:
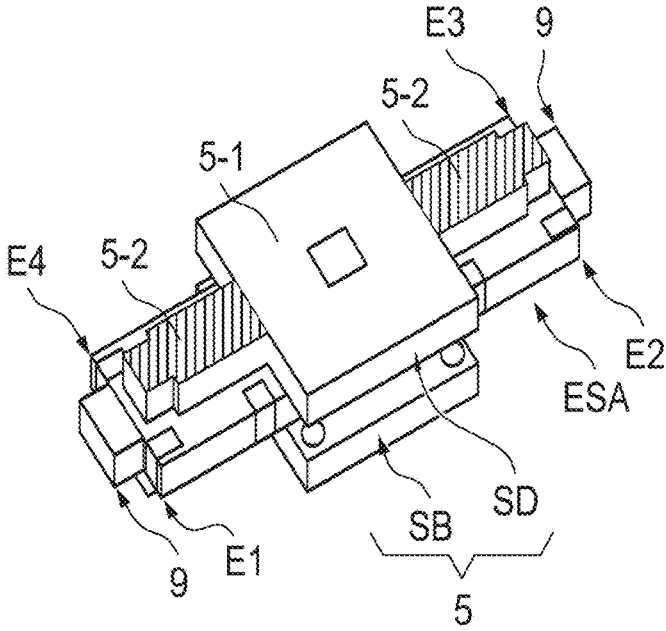
FIG. 2 shows a carrier in accordance with the invention.

An example of the carrier 5 is depicted in FIG. 2 (as well as in FIG. 5). The carrier 5 includes two carrier plates SD and SB, between which the ESA is clamped along the stacking direction (z axis). The carrier plates have a central region that circumferentially covers the ESA and on whose margins there is space and openings for fasteners (such as screws or bolts) for the two carrier plates. The carrier 5 additionally has regions 5-2 that are made of a material that either absorbs weakly in the range of the CT radiation or are made thinner than a central region 5-1 of the carrier 5. The weakly absorbing regions 5-2 are located at the corners of the electrode sheets and thus ensure improved image quality of the electrode sheets in the region of the corners E1, E2, E3, E4.

The electrode sheets of the ESA in the present example are rectangular, wherein the long edges of the electrode sheets are parallel to the edges of the carrier so that an edge direction of the electrode sheets is imparted by means of the carrier. The ESA has four corner regions E1, E2, E3 and E4, in which the corner regions and corners of the electrode sheets are arranged. Conductor tabs 9 for the cathodes and the anodes are provided on each of the end faces of the ESA.

In the present example, the carrier 5, 5-2 overlaps laterally with the electrode sheets of the ESA only in the central region 5-1, wherein the corner regions of the electrode sheets are exposed. The carrier 5 can also be made of a material that is transparent (to X-ray radiation) in these regions 5-2, which gives the assembly increased stability and robustness to impacts.

Sectional views of an idealized ESA are depicted in FIGS. 3 and 4. The ESA is formed of a multiplicity of electrode sheets of a first and a second type that are grouped along a stacking direction (z axis) of the ESA, spaced apart in alternation, and insulated from one another by separator layers S, to form the ESA, and are compressed by the carrier 5, at least in the central region of the carrier 5, said carrier 5 comprising the carrier parts SD and SB. The region to be imaged is advantageously covered only by the regions 5-2 of the carrier so that radiography can be accomplished efficiently. In these regions 5-2 and also 5-1, the electrode sheets run parallel to the carrier plates of the carrier parts, wherein this direction/plane corresponds to the x-y direction/plane, which is imparted by the carrier 5, for example.

The electrode sheets of the first type correspond to the anodes A and the electrode sheets of the second type correspond to the cathodes K. As can be seen in FIG. 4, for example, the anodes project past the cathodes (distance $d_{AK}(x)$) along the depicted section in the direction of the x axis, since the anodes are circumferentially larger than the cathodes. This means that the anodes also project past the cathodes along the y axis (not shown). The separator layers, for their part, project circumferentially past the anodes (distance $d_{SA}(x)$). The latter serves the process reliability of the ESA, whereas the anodes project past the cathodes in order to ensure complete coverage of the cathodes, which ensures performance of the ESA.

The electrodes as well as the separator layers can be identified as a function of their position (A(z), K(z), S(z)) in the ESA.

For the most part, the separator layers are not discernible in the computed tomography images.

The rectangular electrode sheets in this example accordingly have 4 corner regions E1 to E4 at which the edges of the electrode sheets meet (FIG. 5).

In the production process for the ESA, the electrode sheets are stacked serially, wherein the electrode sheets or their corners must be located in predefined tolerance ranges along the x and y directions. This is depicted schematically in FIG. 6. Owing to the known geometry of the electrode sheets, the pose of the electrode sheets can thus be deduced when either the positions of multiple corners are ascertained or when the edges enclosing the corner and the profile direction thereof are ascertained.

The geometry of each electrode sheet can, for example, be ascertained by an optical method before stacking in the ESA, so that the geometry, for example the dimensions, is/are known for each electrode sheet. The optical acquisition can be carried out by a camera system, for example, that is connected to an evaluation unit, so that the geometry can be determined and also associated with the respective electrode sheet.

The corners of the electrode sheets are defined, for example, by extension of the edges that enclose these corners, since the electrode sheets may be rounded or broken off at the corners in some cases.

Figure 6:
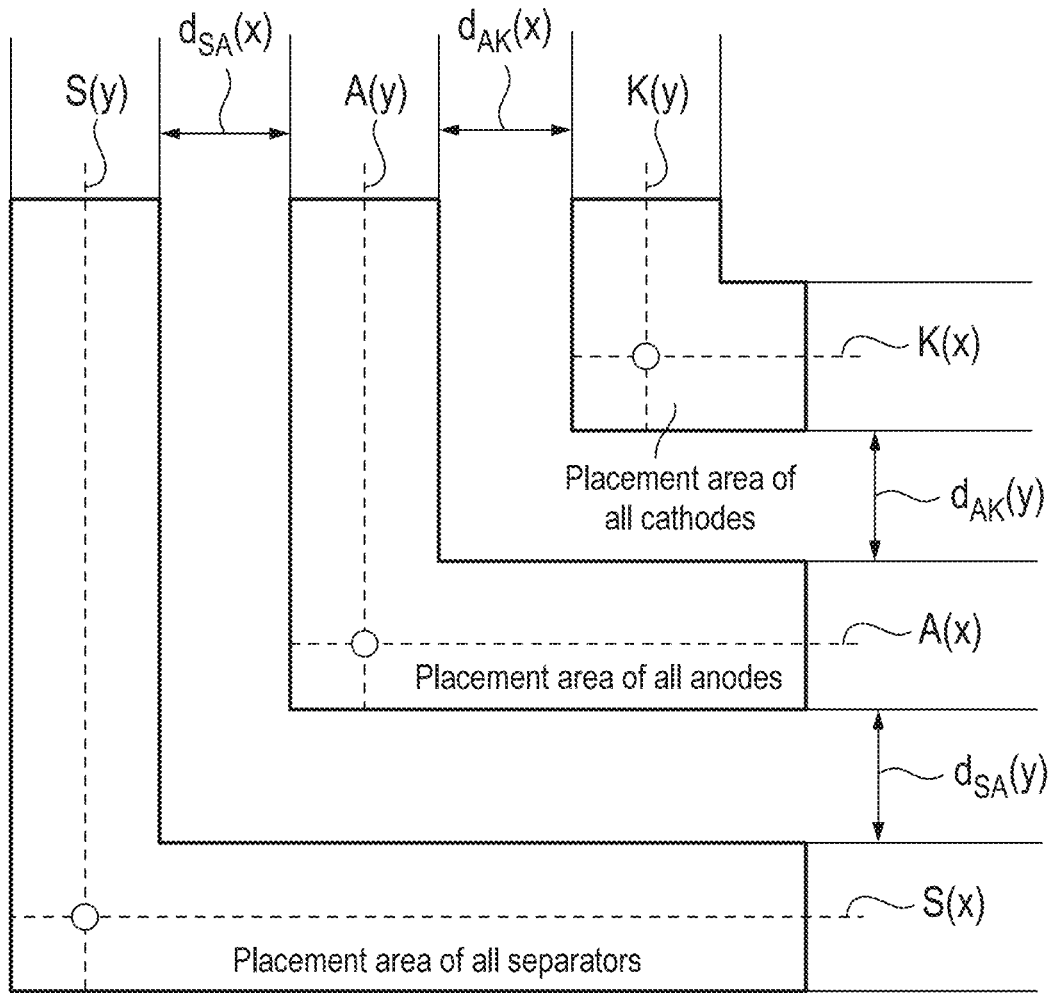
FIG. 6 shows a schematic representation of the placement zones for the electrode sheets of the ESA.
Figure 6:
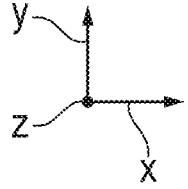

FIG. 6 shows, for one corner region, which tolerance ranges the corners of all electrode sheets in a stack should be located in, wherein a distinction is made between the anodes and the cathodes (and also the separator layers). The positions of the corners of the anodes in the x-y plane are specified, for example, in the form of A(x) (x coordinate) and A(y) (y coordinate), while the positions of the corners of the cathodes in the x-y plane are specified in the form of K(x) (x coordinate) and K(y) (y coordinate). The tolerance ranges are represented in FIG. 6 as bands along the axes in question. In order for the electrode edges to lie within these bands, the electrode sheets must have only a slight rotation and translation relative to an ideal geometric center position of the electrode sheet.

Determining the location of a corner and its edges makes it possible to establish whether the respective electrode sheet lies in the specified tolerance bands. This should be determined according to the invention for each electrode sheet in the ESA.

The tolerance ranges typically lie in the submillimeter range, while the distances $d_{AK}(x)$ and $d_{AK}(y)$ in the x direction and y direction likewise lie in the submillimeter range. This means that the anodes project only slightly, which requires high precision in stack production.

In general, it can be said that a multiplicity of inspection characteristics can be determined in an ESA stack that includes a number N—for example 20—of cathode sheets. Inspection characteristics in this case include the following test criteria, for example:

All four corners of the 2N+1 separator layers must lie in the defined placement area for the separators in the x and y directions.

All four corners of the N+1 anodes must lie in the defined placement area for the anodes in the x and y directions.

All four corners of the N cathodes must lie in the defined placement area for the cathodes in the x and y directions.

The placement of the various electrode sheets and separator layers must be present in the correct sequence (alternating): $S_1$-$A_1$-$S_2$-$K_1$-$S_3$-$A_2$-$S_4$-$K_2$-$S_5$ . . . $A_{N+1}$-$S_{2N+1}$.

The distance of all separators from all anodes in the x and y directions must be greater than the minimum distance $d_{SA}(x)$ or $d_{SA}(y)$.

The distance of all anodes from all cathodes in the x and y directions must be greater than the minimum distance $d_{AK}(x)$ or $d_{AK}(y)$.

The position of the ESA relative to the carrier can be centered, so that an optimal straight line in the x and y directions can be defined at all corners for the separators, the anodes, and the cathodes.

Figure 7:
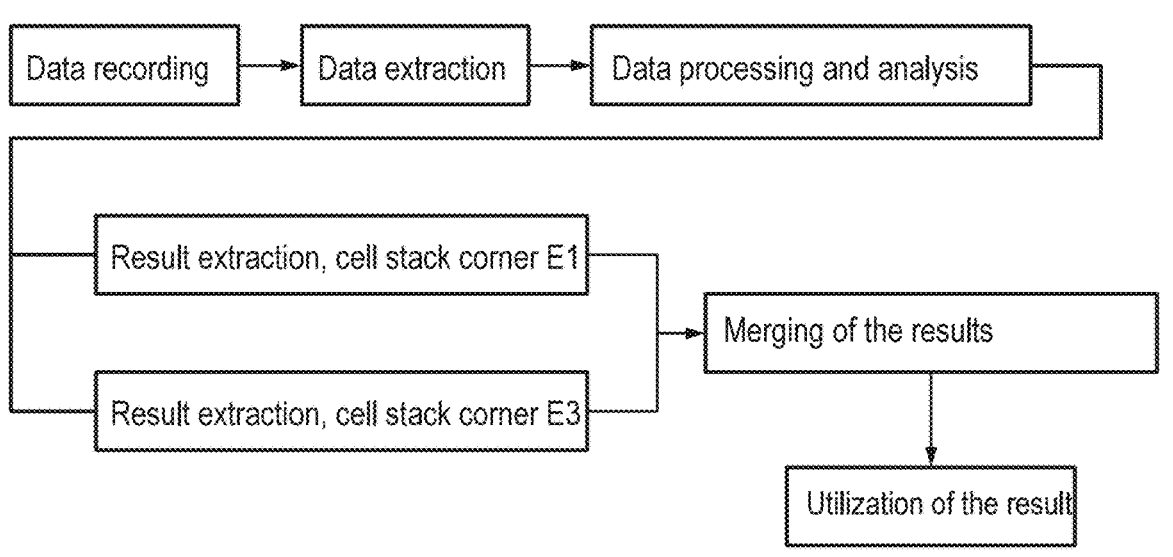
FIG. 7 shows a flowchart to represent the method according to the invention.

Depicted in FIG. 7 is a flowchart in which a general sequence of the method according to the invention is shown. After data recording, which in this example creates a data set of two diagonally opposite corner regions of the ESA that includes 3D location information on the rectangular electrode sheets, the data is processed and analyzed in that the position of the corner is ascertained for each of the corner regions and for each electrode sheet broken down by type and position in the stack of the electrode sheet.

From the positions, it is possible to determine the precision/tolerance with which the electrodes are arranged in the ESA. For this purpose, a pose in the stack can be determined for each electrode sheet. In the course of the merging of results, the pose, which is to say the actual pose (orientation and position), of each electrode sheet is determined, for example by the means that a relative rotation and translation with respect to a nominal pose is determined via the known geometry (rectangle) of the electrode sheet and the determined diagonally opposite corner positions of the electrode sheet. This can advantageously occur through the determination of an instantaneous center of rotation that specifies and quantifies the deviation of the actual pose from the nominal pose by means of an angle of rotation and a center of rotation. On the basis of this deviation, the placement of further electrode sheets can be corrected, for example in the course of the utilization of the result, so that the deviation is minimized. The deviation can likewise be used for quantifying performance or a manufacturing tolerance.

It is noted in this context that the position and orientation are determined on the basis of a coordinate system that is imparted as described above by the carrier, for example, or a marker arranged in the investigation space. In this way, the actual pose of the electrode sheets can be determined precisely and reproducibly from the data.

Figure 8:
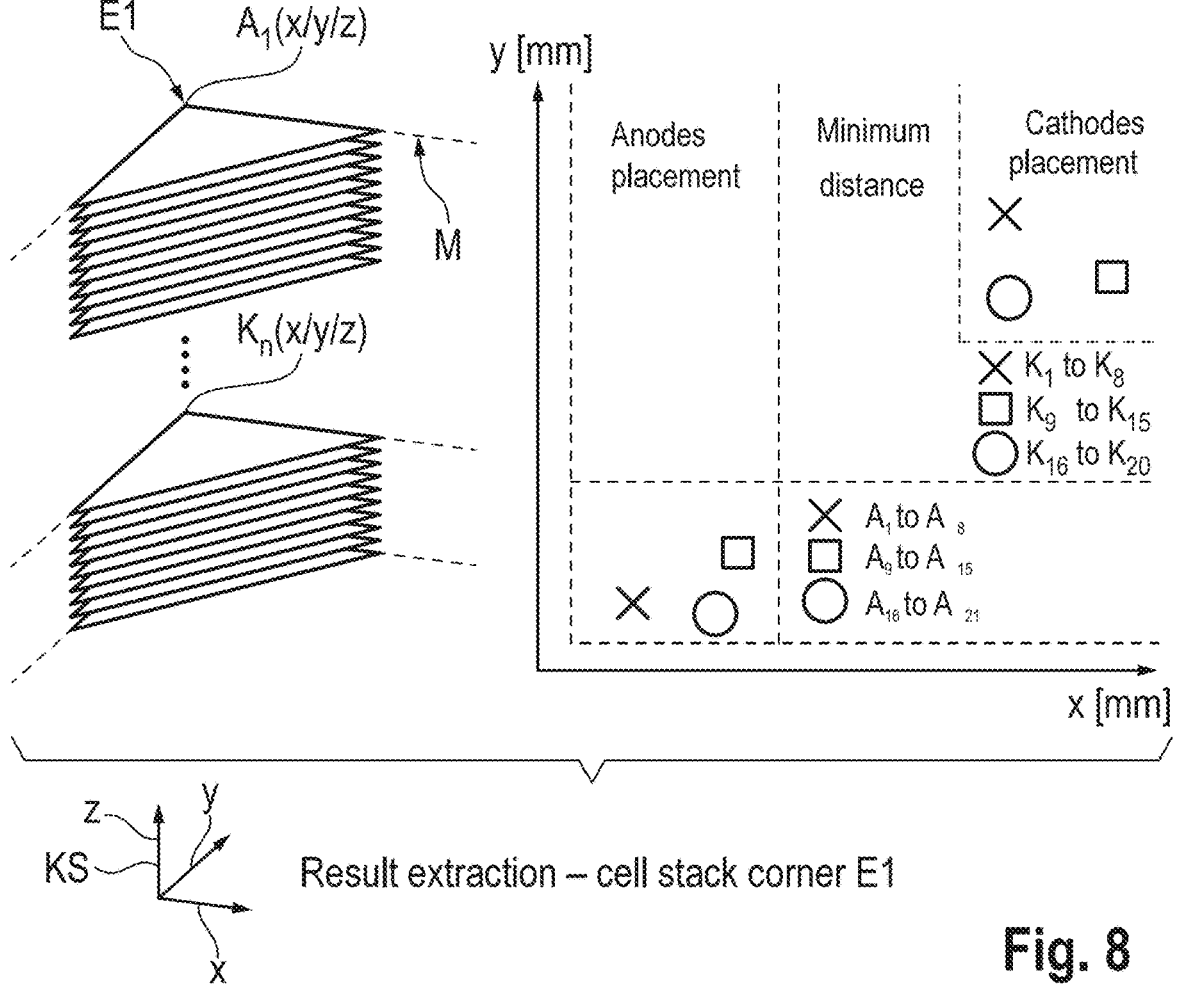
FIG. 8 shows a schematic representation of the result extraction step for one corner.

The evaluation principle of result extraction is shown schematically in FIG. 8 for a corner region E1 of the ESA. In this process, a 3D position of the corner of the electrode sheet is determined from the data recorded for each electrode sheet, broken down by type. As regards the position along the z axis, this can also be specified by an index that represents a position in the stack. The x and y coordinates of the corners, which is to say the corner positions, are ascertained very exactly by methods described below. The corner positions thus determined can be represented graphically in a coordinate system (right-hand panel in FIG. 8). In this example, it can be seen that the corners of the electrode sheets lie in specific regions of the tolerance range of the placement positions depending on the position in the stack.

Thus, corner positions of the first eight anode and cathode sheets are clustered in a region that is represented by an "X," while the subsequent six anode and cathode sheets are clustered in a region that is identified with a square. The other anode and cathode sheets are clustered in a region that is identified with a circle. All corners lie in the specified tolerance range. This analysis can be carried our for at least one additional corner region and in this way an actual pose of the electrode sheets can be determined. This is shown analogously in FIG. 9. Here, the clusters are distributed slightly differently (see indices $K_1$ to $K_8$ and $A_1$ to $A_{10}$, etc.). Nevertheless, all corners lie in the tolerance range.

Conversely, if the positions of all corners are ascertained, the geometry of the electrode sheet can be determined.

Figure 9:
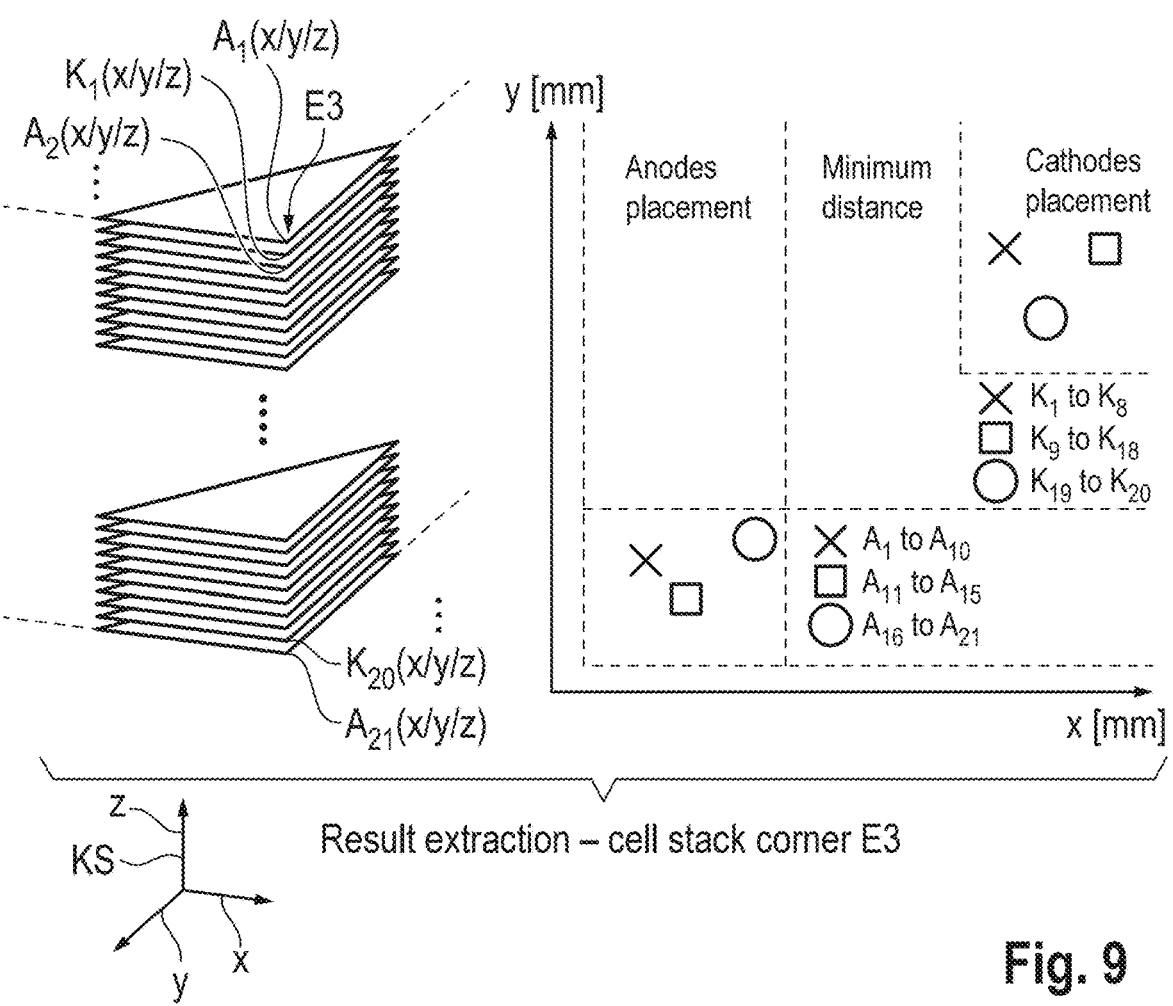
FIG. 9 shows a schematic representation of the result extraction step for another corner.
Figure 10:
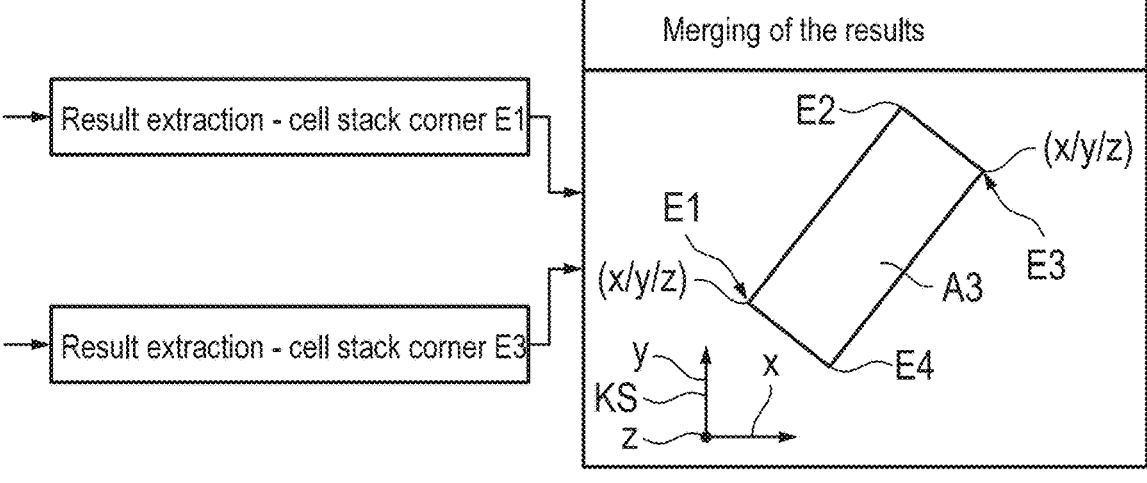
FIG. 10 shows a schematic representation of the merging of results for determining a pose of the electrode sheet.

How the results from the corner positions of the electrode sheets and the known rectangle geometry determined in FIGS. 8 and 9 are merged in order to determine an actual pose for each electrode sheet is shown in FIG. 10.

Figure 11:
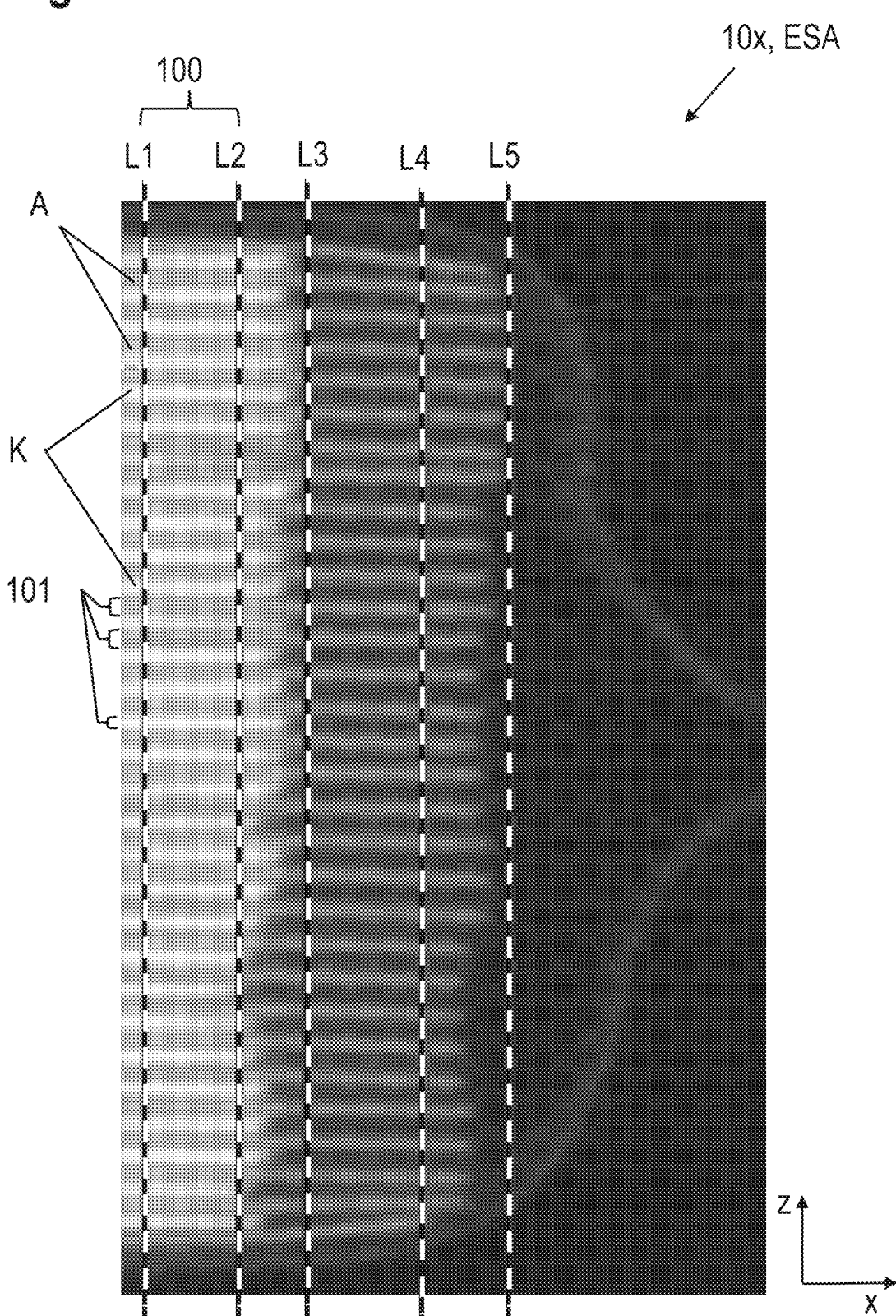
FIG. 11 shows a sectional view of a CT image of an ESA.

An xz sectional view of a computed tomography image of a corner region of an ESA is shown in FIG. 11. The electrode sheets, distinguishable as anodes (dark gray and projecting) and cathodes (light gray and shorter), are identifiable in this view. The electrode sheets are stacked in alternation along a stack height in the z direction. Not visible are the separator layers arranged between each of the electrode sheets.

In a reference location region between the lines L1 and L2, the electrode sheets in the ESA are arranged essentially parallel and without gaps. This is ensured by the carrier (which cannot be seen in the image), which presses the electrode sheets together along the z direction.

The reference location region is therefore suitable for determining an ideal "horizontal" electrode sheet profile, which is to say along the x-y plane.

As is namely also evident from FIG. 11, the electrode sheets of the anodes A are bent in some regions at their electrode edges, also referred to in the context of this specification as electrode edge location, and therefore project out of the x-y plane of the respective electrode sheet defined by the reference location along the z direction. This is also shown as a detail in FIG. 12.

In order to determine a meaningful corner position of the anode, it is necessary to correct for this type of deviation.

Also in FIG. 11, a region is demarcated between the lines L2 and L3 where all electrode edge locations (which is to say the electrode sheet edges) of the sectional image that are associated with the cathodes are situated. Furthermore, in FIG. 11 a region is delimited between the lines L3 and L4 where all electrode edge locations of the anodes are situated.

The identification of the reference location region 100, as well as of the regions of the electrode edge locations, can be accomplished by means of convolutional neural networks specifically trained for this. A second CNN system can be provided for this purpose. Subsequently, the electrode edge location of the electrode sheets can be identified in these regions, which is to say the position of the electrode sheet edges in the sectional image. According to the invention, this is accomplished with the first CNN system.

The identification of the electrode sheets is likewise accomplished by means of specifically trained convolutional networks, for example the electrode sheets in the reference location region 100 and also the provisional electrode edge locations (the latter by means of, e.g., a third CNN system) are identified and then successively acquired in a robust manner through segment-by-segment pattern recognition in the regions L2 and L3 or L4 and L5 toward the electrode edge locations. The use of CNNs is especially advantageous in this case because the gray-level values vary within the electrode sheets and consequently a histogram-based recognition, for example, would be disadvantageous. The task of electrode edge recognition is carried out according to the invention with the first CNN system. The pattern recognition can likewise be accomplished through CNNs, wherein different CNNs can be used for the two different types of electrode sheets as well. These CNNs are then part of the first CNN system.

In order to reliably ensure the identification, the number of electrode sheets stacked in the ESA can be specified as a boundary condition.

The goal is to determine the electrode edge location of each electrode sheet in every sectional image.

Figure 14:
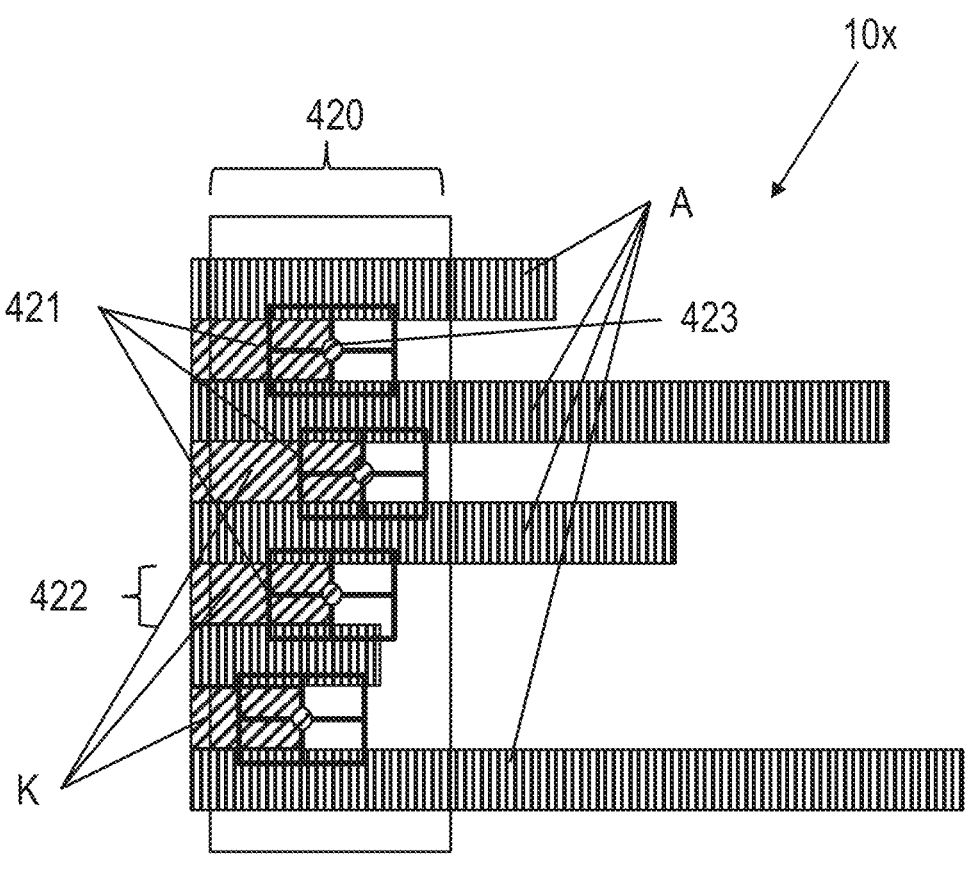
FIG. 14 shows a schematic representation of the provisional electrode edge location determination of the cathodes in the sectional image by means of a CNN.
Figure 14:
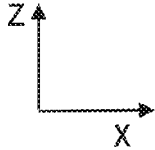

The pattern recognition is carried out in segments of equal size, for example, wherein the segments are arranged in succession along the x or y direction—in the case of the xz sectional image, the segments are thus arranged in the direction of the x axis—this is shown in FIG. 14, for example.

Figure 12:
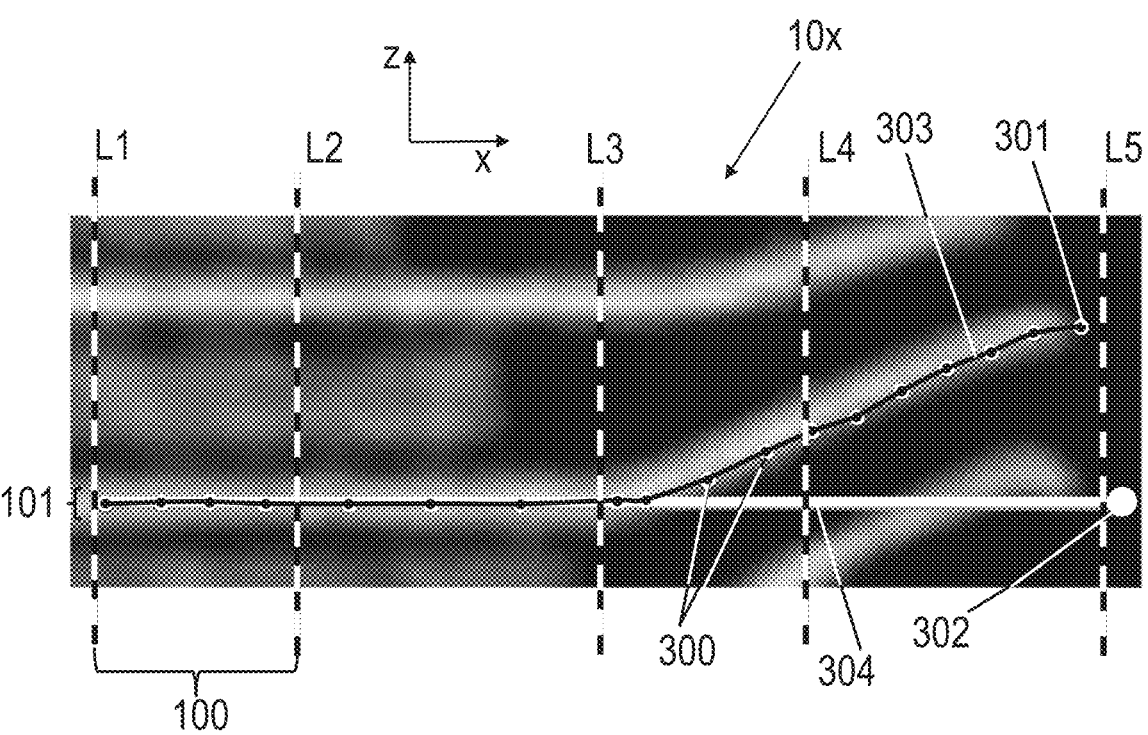
FIG. 12 shows an enlarged view of the sectional image.

Now a data point, which is to say a geometric center position of the predetermined pattern (which resembles a section of the electrode sheet), can be determined in every segment in which the pattern recognition has recognized the electrode sheet. In this way a multiplicity of data points, along which the electrode sheet extends, are determined in every sectional view and for each electrode sheet. A path that connects the data points can be laid in every sectional image through the data points of an electrode sheet. This is depicted in FIG. 12. The data point that corresponds to the electrode edge location in this case is situated the farthest outside the ESA, and in the context of the present specification is also referred to as the first data point.

The determination of the data points is accomplished in this case with a first CNN system.

In each case, the first data point—which is to say the electrode edge location—is determined for each electrode in the ESA and in all xz and yz sectional images.

Now, in order to determine a corner position for each electrode sheet, the first data point and any additional data points are shifted to the height of the reference location of the respective electrode sheet, namely in such a manner that the path through the data points runs along a straight line along the x direction. The data points that lie in the reference location region 100 serve as the height of the reference location in this case. From the positions of these data points, a mean height, for example, can be calculated. This height then corresponds to the height of the reference location 101 of the electrode sheet. This process is illustrated in FIG. 12. The shifted first data point 301 and the corrected electrode edge location 302 resulting therefrom are plotted for one electrode sheet. The corrected electrode edge location 302 corresponds to an electrode edge location for an electrode sheet that would be perfectly aligned in extension of the reference location 101 when not bent or folded. For example, this is located farther outside than the first uncorrected data point. It is important in this transformation that the path length of the path through the data points 300 remains constant during transformation (which is to say the shifting of the data points).

The data points 300 can be connected into a path 303 by means of a cubic spline, for example.

Figure 13:
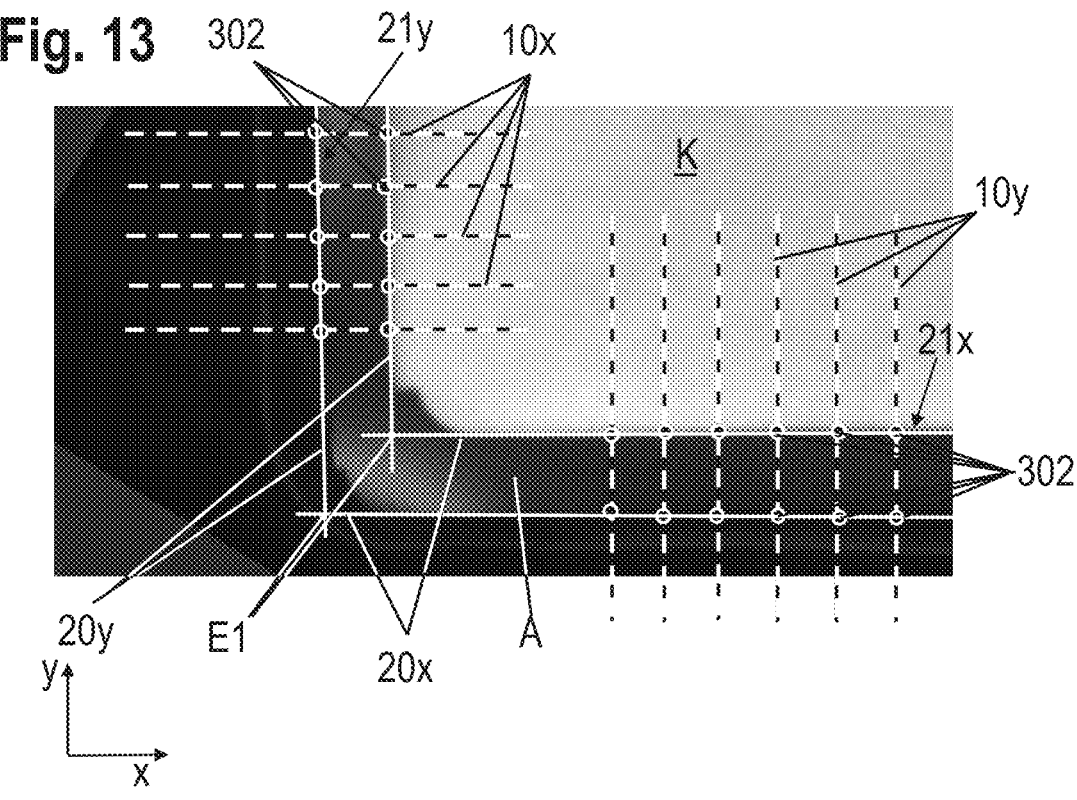
FIG. 13 shows a sectional view of the CT image along the x-y plane.

In FIG. 13, the location and arrangement of the xz and yz sectional images are shown in a section along the x-y plane through an ESA. The xz and yz sectional images are determined in a corner region of the ESA along the dashed lines. Furthermore, the corrected first data points for an anode and a cathode are plotted.

In order to now determine the corner position of the two electrode sheets, a straight line is found through the corrected first data points for each electrode sheet for the first edge profile (along the y axis) and the second edge profile (along the x axis) in each case. In this process, essentially only the x-y positions of the first data points are relevant. The corner of the electrode sheet in question is then located, according to the invention, at the intersection point of the straight lines through the first and second edge profiles in the x-y plane.

FIG. 14 shows one possibility for determining the provisional electrode edge location of the electrode sheets on the basis of an xz sectional image and for each electrode sheet contained therein.

In the present example, in which the electrode assembly stack has electrode sheets of the first and second types, the following CNN system architecture can be advantageous:

For this purpose, the third CNN system introduced in the preceding paragraphs is used, which in this case includes, for example, a first CNN (CNN2) that is trained to identify a region 420 of the electrode assembly stack in each sectional image that includes the electrode edge locations of the electrode sheets of the second type, which is to say the smaller cathode sheets, for example. The identification in this case is, for example, not focused on the individual electrode sheets, but instead serves only to find the region in which the electrode edge locations of all electrode sheets of the second type are situated.

In addition, the third CNN system includes a second CNN (CNN5), which is trained to detect the electrode edge location of the electrode sheets of the second type in the region identified by the first CNN (CNN 2), wherein the electrode edge location is treated only as a provisional result in this process, which is expressed with the phrase "provisionally determines." In order to provide a reliable provisional determination, the number of the electrode edge locations to be identified can be specified (for example, implicitly through the training set or through an additional boundary condition). An improved robustness and reliability is achieved by the limitation of the region for recognition of the electrode edge locations.

The electrode edge locations of the first type are provisionally determined in the same manner. In other words, the third CNN system additionally includes a third CNN (CNN1), which, analogously to CNN 2, determines a region 430 (see FIG. 15) that includes the electrode edge location of the first type, which is to say, for example, anode A, in every sectional image. Wherein a fourth CNN (CNN4) then provisionally determines the provisional electrode edge locations 433 of the electrode sheets of the first type in this region.

In order to provide a reliable determination, the number of the electrode edge locations to be identified can be specified (for example, implicitly through the training set or through an additional boundary condition). An improved robustness and reliability is achieved by the limitation of the region 420, 430 for recognition of the electrode edge locations.

The CNN 5 for determining the provisional electrode edge locations of the cathodes K in this case is trained particularly for recognizing a feature 421 that includes not only regions of the cathodes K, but also includes the anode sheets A at the margins (in FIG. 14, the feature 421 is surrounded by a rectangular frame). This means that the feature 421 is higher than the expected cathode sheet thickness 422 in the image, which ensures that parts of the adjacent anode sheets A can also contribute to stabilization. Furthermore, it is specified that the features 421 do not overlap or do not intersect. The feature 421 is essentially rectangular, and has, in the center, the electrode edge location 423 (identified as a circle) assigned to the feature that corresponds to the provisional electrode edge location 423.

The provisional electrode edge location 423 of the cathodes can subsequently be defined even more precisely, for example with additional CNNs.

Figure 15:
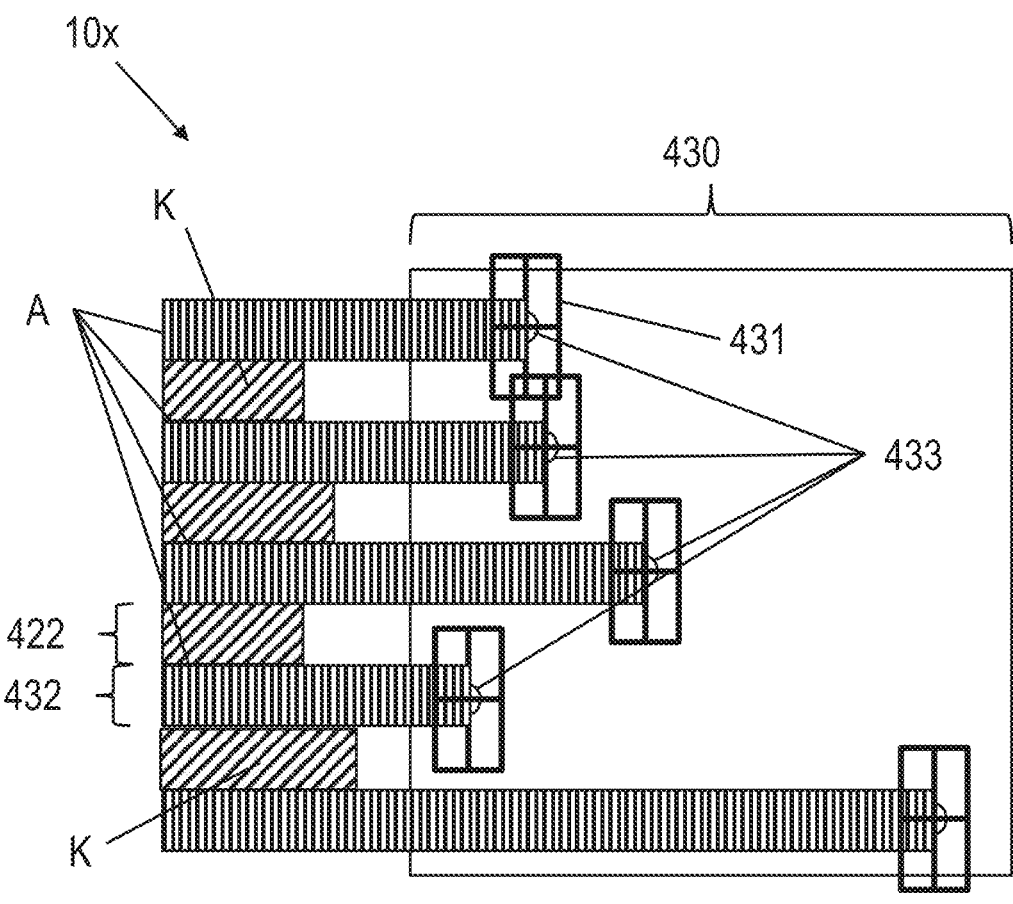
FIG. 15 shows a schematic representation of the provisional electrode edge location determination of the anodes in the sectional image by means of a CNN.
Figure 15:
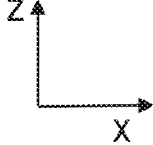

In similar fashion, the provisional electrode edge location can be determined by means of the CNN 4 for the anodes A in the previously identified region 430 of the anode edges (see FIG. 15). The feature 431, for which the CNN4 is trained, differs from feature 421 of the CNN 5. It is likewise rectangular, but includes a different pattern. A position 433 that is associated with the provisional electrode edge location of the anode A is associated with this feature 431, as well. The size (height, width) of the feature 431 plays an important role here, wherein the size preferably is chosen such that the feature is twice as narrow in the x or y direction as in the z direction and taller than the anode sheet thickness 432. The features may overlap in this case. The circle in the center of the rectangular feature indicates the determined provisional electrode edge location 433 of the anode A.

Figure 16:
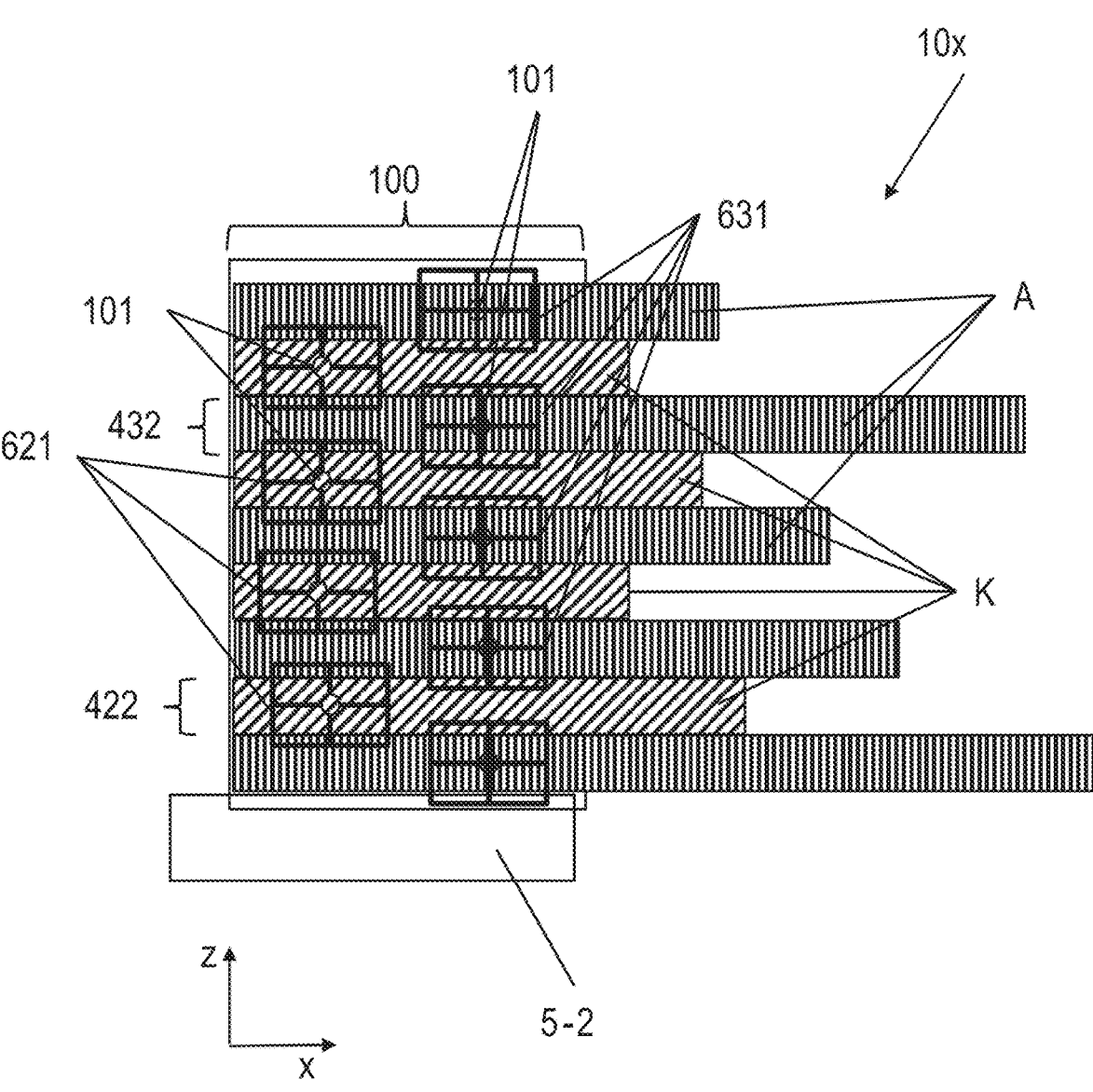
FIG. 16 shows a schematic representation of the determination of the type of the electrode sheets and the sequence of the electrode sheets in the reference regions of the ESA in the sectional image by means of a CNN.

Yet other features and other CNNs (CNN 6 or CNN 7) can be used for identification of the electrode sheets in the reference region 100, wherein the features 621, 631 each advantageously include adjacent electrode sheets A, K (see FIG. 16).

The first CNN system can, for example, determine the first and, if applicable, additional data points 101 in these recognized characteristics (type of electrode sheet, position of the electrode sheet in the electrode assembly stack, reference location region, provisional electrode edge locations), so that a path that includes and connects the data points and reproduces the profile of the electrode sheet in the sectional image is determined. For example, the first data point here corresponds to the (final) electrode edge location, which is to say no longer to the provisionally determined edge location 423, 433.

The creation of the path through the data points can likewise be accomplished by means of a CNN.

Figure 17:
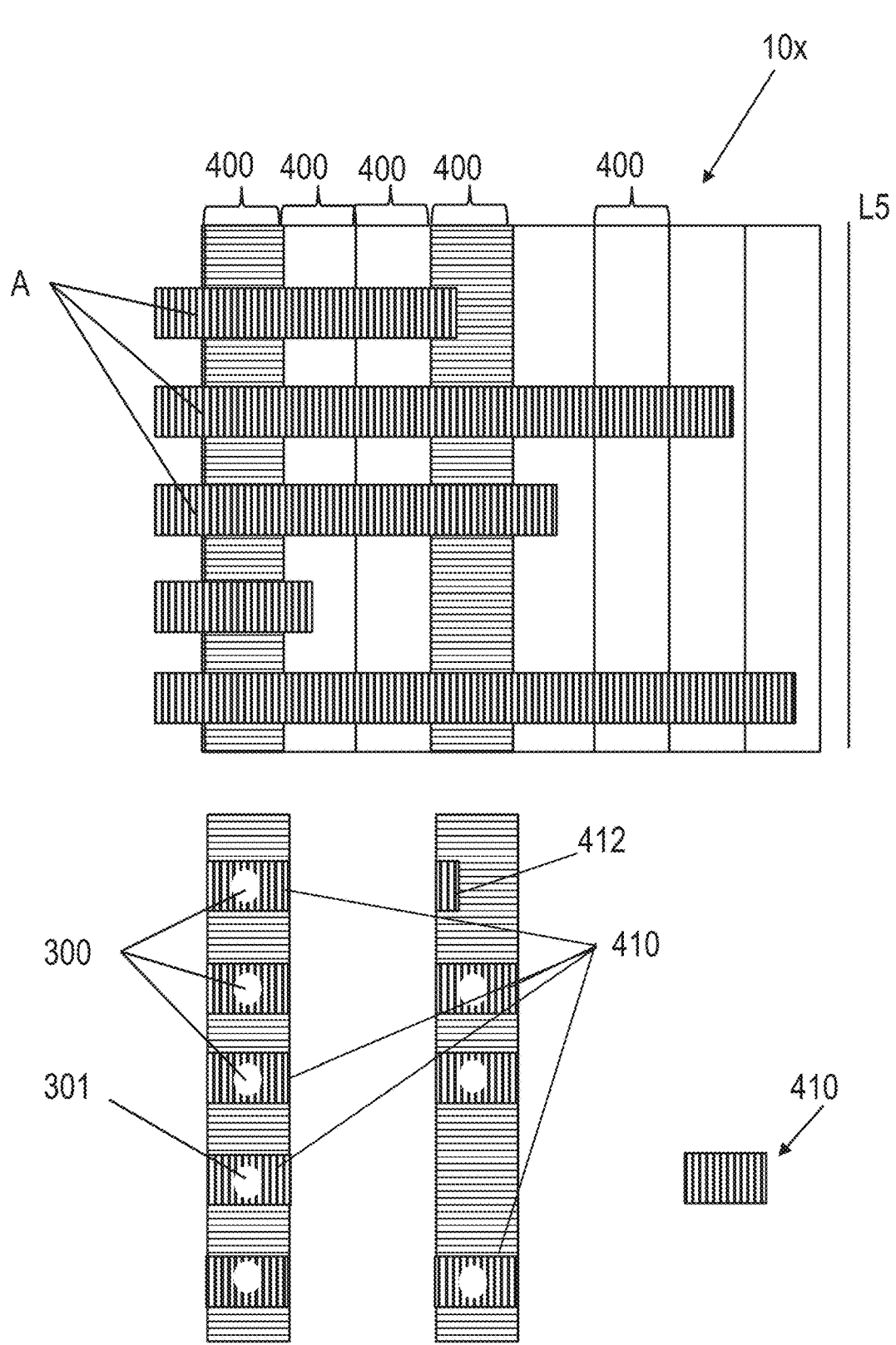
FIG. 17 shows a schematic representation of the segment-by-segment identification of the data points by means of a CNN.

How the first CNN system determines the electrode edge location for the electrode sheets of the anode A is shown in FIG. 17.

For this purpose, the region 430 between L4 and L5, in which it was determined that the provisional electrode edges

433 of the anodes A are situated, is subdivided into a multiplicity of segments 400, for example. Subsequently each segment 400 is searched for the feature 410 shown in FIG. 17 by means of a CNN that is trained for recognition of this feature. It should be noted that even a profile of the anode sheet A that is not horizontal is reliably recognized, since the segments 400 are chosen to be so small that the outward appearance of the electrode sheet is virtually unchanged within the segment 400. In the first hatched segment 400, the CNN recognizes and localizes the corresponding feature 410 from all anode sheets A. The spot associated with the feature can be used as data point 300 for the respective electrode sheet A.

Only three electrode sheets of the anode A extend completely through the second hatched segment, while one electrode sheet extends only partially 412 into the segment 400. The CNN therefore recognizes only the electrode sheets with the complete feature 410.

The preceding segment can be associated with the electrode sheet that only partially 412 extends into the segment as the position of the electrode edge (which is to say the electrode edge location), or in other words the first data point 301. The error of this association with regard to the actual electrode edge is negligible and, on account of the size of the segments 400, lies in the range of the localization tolerance and is very accurate.

In analogous fashion, the edge locations of the cathodes K are determined by means of another CNN of the first CNN system (not shown).

The multiplicity of the data points 300 effected in the segments 400 by the pattern recognition are now connected to one another, for example by means of a spline path. A length of the path is calculated and, as already explained above, the path is then transformed so that it runs along a straight line and has the same length. In this way, the position (height and x or y direction) of the first data point 301 is changed as necessary. This new position corresponds to the corrected electrode edge location through which the straight lines are then produced, permitting a very accurate positioning of the corner of the electrode sheet at their intersection point (see FIG. 13).

With the method according to the invention, a placement precision of electrode sheets in an ESA can be determined efficiently and reliably, and a correction or improvement of the placement of the electrode sheets can also be determined if necessary from the pose of the electrode sheets determined.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining a position of corners of polygonal electrode sheets in at least one corner region of an electrode assembly stack, the method comprising:

3D imaging of the corner region of the electrode assembly stack in an imaging region via an imaging process so that a data set is created that includes 3D position information of the electrode sheets in the corner region of the electrode assembly stack relative to a carrier or to a marker arranged in the imaging region;

determining, from the data set, a first and a second edge profile of the edges framing the corner region of each electrode sheet, wherein a position of the corner of the respective electrode sheet is determined on the basis of the edge profile; and determining the first and second edge profiles by:

creating a plurality of xz sectional images and yz sectional images;

identifying the electrode sheets in each xz sectional image and in each yz sectional image;

in each xz and each yz sectional image, and for each identified electrode sheet therein, determining, by a first neural network system in each xz and each yz sectional image and for each identified electrode sheet therein, an electrode sheet profile of a reference location in the electrode assembly stack up to an electrode edge location of the electrode sheet;

adjusting the electrode sheet profile so that the electrode sheet profile at a height of the reference location extends from the reference location to a corrected electrode edge location, a path length of the electrode sheet profile remaining unchanged; and determining a straight line that runs along the corrected electrode edge location along the first or the second edge for each electrode sheet, the straight line corresponding to the first edge profile or to the second edge profile.

2. The method according to claim 1, wherein the corrected electrode edge location is ascertained by determining an electrode sheet position at a plurality of data points, wherein a first data point corresponds to the electrode edge location, wherein the reference location of the electrode sheet in the electrode assembly stack is acquired through at least one additional data point, wherein the data points are determined by the first neural network system, wherein the corrected electrode edge location is achieved by shifting at least the first data point to a height of the reference location, and wherein a path length between the first and the at least one additional data point remains constant so that the path length of the electrode sheet profile remains unchanged.

3. The method according to claim 1, wherein an intersection point of the first and second edge profiles is determined for each electrode sheet, wherein the position of the corner of the respective electrode sheet is associated with the intersection point.

4. The method according to claim 1, wherein the method is carried out for two or more corner regions of the electrode sheets of the electrode assembly stack, and in this way the position is determined for two or more corners of the electrode sheets.

5. The method according to claim 1, wherein the electrode sheets in the xz and the yz sectional images are identified by an additional neural network system for the identification of electrode sheets.

6. The method according to claim 1, wherein a pose of the respective electrode sheet relative to the carrier and/or the marker is ascertained on the basis of the first and the second corrected edge profiles and the position of the at least one corner of the respective electrode sheet.

7. The method according to claim 6, wherein a deviation from a predefined pose relative to the carrier and/or the marker is determined on the basis of the pose for each electrode sheet.

8. The method according to claim 7, wherein a placement pose of the electrode sheets on the electrode assembly stack is adjusted during a production process for another electrode assembly stack on the basis of the deviation determined, so that the deviations are smaller in the other electrode assembly stack.

9. The method according to claim 1, wherein positions of remaining corners of the respective electrode sheet that have not yet been determined are ascertained for each electrode sheet from the determined position or positions of the corners, and wherein the ascertainment of the remaining corners is carried out from dimensions of the electrode sheet stored in a database.

10. The method according to claim 9, wherein the electrode sheets of the first type have a different gray-level range in the sectional images than the electrode sheets of the second type, so that the electrode sheets in the data set are distinguished based on the different gray-level range.

11. The method according to claim 9, wherein, in a first image processing step, a neural network system for recognizing a provisional electrode edge location of the electrode sheets provisionally determines the electrode edge location of the electrode sheets in each xz and each yz sectional image and for each electrode sheet, and wherein the reference location is determined in each xz and each yz sectional image and for each electrode sheet, wherein the reference location is determined from a region of the electrode assembly stack where the electrode sheets are stacked at regular distances and/or with no gaps along the stacking direction.

12. The method according to claim 11, wherein the first neural network system determines, in a second image processing step, the plurality of the data points in each xz and each yz sectional image and for each electrode sheet, wherein the determination for the electrode sheets of the first type and for the electrode sheets of the second type is limited to a region that is defined by a provisionally determined electrode edge location of the electrode sheets of the first type or of the second type that is situated farthest toward a center of the electrode assembly stack and a provisionally determined electrode edge location of the electrode sheets of the first type or of the second type that is situated farthest outside.

13. The method according to claim 12, wherein a path and a span associated with the path that corresponds to the path length of the multiplicity of data points are determined for each xz and each yz sectional image and for each electrode sheet, wherein the data points determined for each xz and each yz sectional image and for each electrode sheet are shifted via a transformation to a straight path perpendicular to the height of the electrode assembly stack such that the path length remains constant, via which the height of the first data point is adjusted to the reference location.

14. The method according to claim 1, wherein the plurality of electrode sheets comprises a plurality of electrode sheets of a first type and a plurality of electrode sheets of a second type.

15. A non-transitory computer readable storage medium storing a computer program comprising computer program code that, when executed on a computer, performs the method according to claim 1.

\* \* \* \* \*